No. 880,451.

PATENTED FEB. 25, 1908.

J. HETTRICH.
CORN HARVESTER.
APPLICATION FILED JAN. 11, 1907.

3 SHEETS—SHEET 3.

WITNESSES.
Edward Thorpe,
Fred Ickes

INVENTOR
John Hettrich
BY Munn & Co
ATTORNEYS

UNITED STATES PATENT OFFICE.

JOHN HETTRICH, OF GRAND ISLAND, NEBRASKA.

CORN-HARVESTER.

No. 880,451.     Specification of Letters Patent.     Patented Feb. 25, 1908.

Application filed January 11, 1907. Serial No. 351,808.

*To all whom it may concern:*

Be it known that I, JOHN HETTRICH, a citizen of the United States, and a resident of Grand Island, in the county of Hall and State of Nebraska, have invented a new and useful Improvement in Corn-Harvesters, of which the following is a full, clear, and exact description.

The purpose of the invention is to improve upon and simplify the construction of the gathering wheel shown and described in my application for Letters Patent for a corn harvester, filed December 6, 1905, Serial No. 290,593, and which was allowed September 25, 1906.

The point of novelty consists in providing the teeth or spokes of the wheel with hinged or pivoted terminals which are automatically operated as the wheel assumes a bent position while taking up the corn from the ground and straightening out the same as soon as the load is ready to be deposited on the table or platform from which it is to be conveyed to the husking mechanism, for example.

The invention consists in the novel construction and combination of the several parts as will be hereinafter fully set forth and pointed out in the claims.

Reference is to be had to the accompanying drawings forming a part of this specification, in which similar characters of reference indicate corresponding parts in all the figures.

Figure 1:
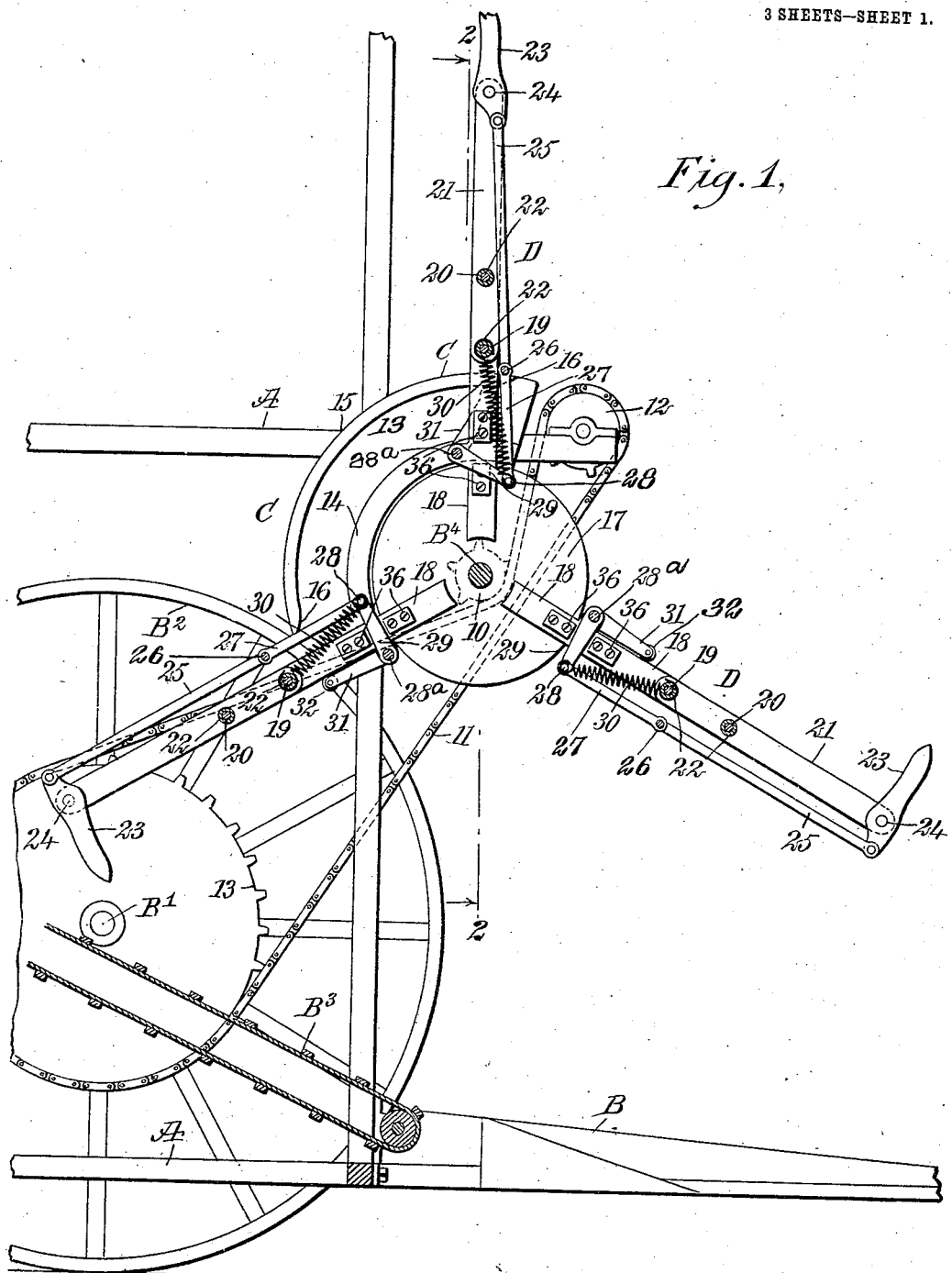
Figure 2:
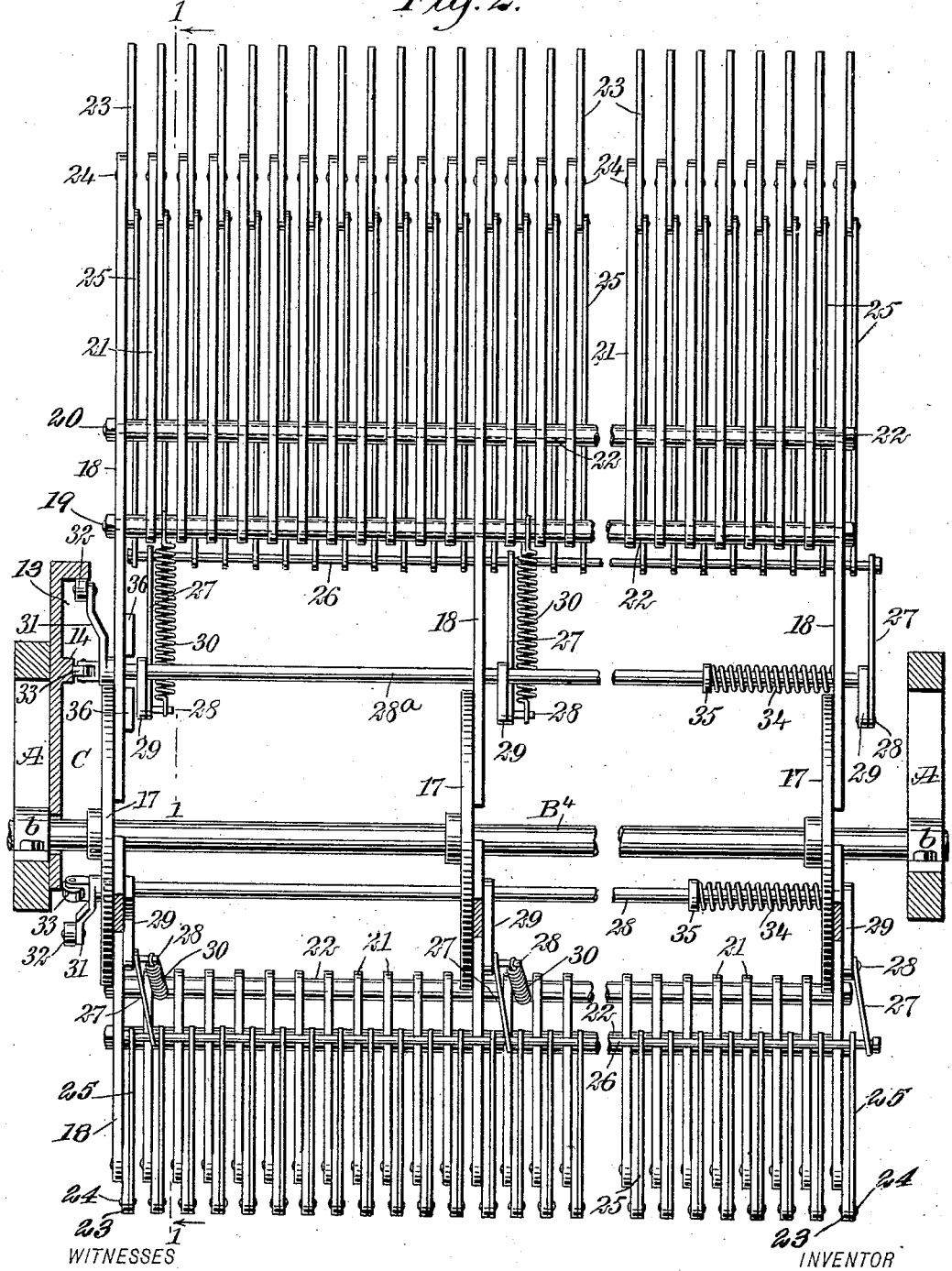
Figure 3:
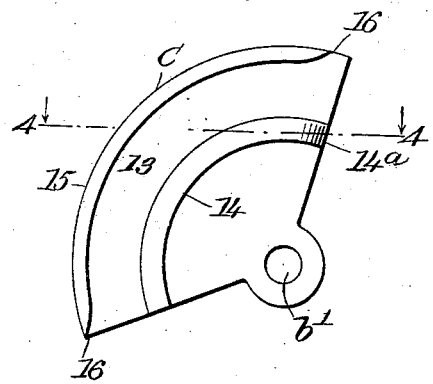
Figure 4:
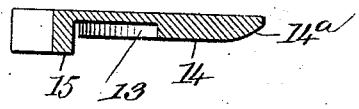

Figure 1 is a vertical section through the improved wheel taken practically on the line 1—1 of Fig. 2, and is likewise a section through a part of the forward portion of a corn harvester; Fig. 2 is a vertical section taken substantially on the line 2—2 of Fig. 1; Fig. 3 is an inner face view of a cam employed in controlling the wheel; and Fig. 4 is a section taken substantially on the line 4—4 of Fig. 3.

A represents a portion of the frame of a corn harvester, B the cutting mechanism, B' an axle for the machine, $B^2$ a supporting wheel carried by the said axle, and $B^3$ represents an elevator adapted to convey the cut corn to a shocking device, or to otherwise dispose of the product, and $B^4$ represents the drive shaft of the gathering wheel which is the subject matter of the present invention. This drive shaft $B^4$ is driven usually as is illustrated in Fig. 1, wherein a sprocket wheel 10 is secured upon an end portion of the said shaft $B^4$, being engaged by a chain belt 11 that passes over a sprocket wheel 12 mounted at the upper portion of the frame, and also over a larger sprocket wheel 13 secured to a supporting wheel $B^2$ or to the axle B', if said axle is turned by the rotation of said supporting wheel.

The gathering wheel consists of spokes that are in series D, and since all of the series of spokes are of the same construction and are operated in the same manner, and as all of said series of spokes is attached to the drive shaft $B^4$, I will confine myself to the description of one series D only.

At one side of the frame A, as is shown in Fig. 2, a segmental cam C is secured and the drive shaft $B^4$ passes through a suitable opening b' at the apex of the cam, as is shown in Figs. 2 and 3, and the said drive shaft $B^4$ is journaled in suitable bearings b carried by the side members of the frame A, as is shown in Fig. 2. At the inner face of the cam C a segmental rib or track 13 is formed and one end $14^a$, which is the entering end of the track 14, is more or less inclined, as is indicated in Fig. 3. The cam C is likewise provided upon its inner face at its segmental marginal portion with a flange 15, and this flange terminates somewhat short of the side edges of the cam and the terminal portions of the flange are inclined or curved, as is indicated at 16 in said Fig. 3.

Disks 17, usually three in number, as shown, are secured upon the drive shaft $B^4$, and supporting arms 18 are secured to the said disks, which arms may be of any desired length. A shaft 19 is passed through all of the supporting arms 18 and to the rear of the shaft 19 a second shaft 20 is similarly located, being in parallelism with the shaft 19, as is shown in Figs. 1 and 2. The outer end portions of the supporting arms 18 practically serve as spokes, and between the said supporting arms 18, or that portion of the arms that acts as spokes, a series of auxiliary spokes 21 is located, and the shafts 19 and 20 pass through these auxiliary spokes, as well as through the connecting arms 18, as is clearly shown in Fig. 2, and the auxiliary spokes and the connecting arms are held a suitable distance apart by spacing sleeves 22 located on the said shafts 19 and 20.

Each supporting arm 18 and each auxiliary or intermediate spoke 21 is provided with a finger 23 at its outer end, and these fingers are pivoted to the spokes by suitable pins or bolts 24, or their equivalents, and each finger 23 extends below its pivoted point to a certain extent. A link 25 is pivotally attached to the lower or projecting end portion of each tooth 23, and these links 25 are all connected by a shaft 26, and the said connecting shaft 26 is provided with links 27, usually three in number, that extend from said shaft 26 and are connected by pins 28 with crank arms 29 that are secured upon a shifting shaft $28^a$, parallel with the shafts 26, 20 and 19, as is best shown in Fig. 2. This shifting shaft $28^a$ is mounted to turn in the inner end portions of the supporting arms, as is shown in Fig. 2, and springs 30 are secured to the pins 28 connected with the crank arms 29, which springs are also attached to the inner connecting shaft 19 for the series of spokes. The tendency of the said springs is to draw the fingers 23 downward so as to bring them at a right angle to the spokes, carrying them as is shown at the lower portion of the wheel in Fig. 1 of the drawings. When the fingers 23 are in the position just described, they act to lift up the corn to carry it to the elevator $B^3$ or to any desired point of the machine, but when the spokes arrive at the upper position shown in Fig. 2, and at the upper portion of Fig. 1, the fingers are carried automatically to a perpendicular position so as to facilitate the discharge of the material carried up upon said elevator $B^3$. This is accomplished in the following manner: A crank arm 31 is secured to the upper end of the shifting shaft $28^a$ which faces the cam C, and this crank arm 31 is provided with a roller 32 adapted as the wheel revolves to engage with the inner face of the flange 15 of the cam, as is shown in Fig. 2, and while the roller 32 is in engagement with the cam 15, the shaft $28^a$ will have been locked in a manner to bring the fingers 23 of the uppermost series D of sprockets to the said perpendicular or discharging position, but as soon as the said crank arm 31 disengages from the cam C, the springs 30 act to bring the fingers 23 again to their gathering or supporting position.

A roller 33 is mounted at the end of the shaft $28^a$ that faces the cam C, and this roller, as the roller 32 of the crank 31 engages with the cam, engages with the track 14, and in so doing slides the shaft $28^a$ inward, since the shifting shaft $28^a$ is not only mounted for rotary movement, but for end movement, and when the shaft $28^a$ is thus forced inward. A spring 34 is coiled around the shaft $28^a$, having bearing usually against one of the supporting arms 18 and a collar 35 of said shaft. This end movement of the shaft $28^a$ is for the purpose of permitting the locking connection with, and an unlocking action from the supporting arm 18 that is adjacent to the cam C. This supporting arm 18, just referred to, is provided with two lugs 36 upon its inner face, and these lugs are so spaced as to receive between them the crank arm 29 that is adjacent to the lugs. When the friction rollers leave the cam C the spring 34 acts to force the shaft $28^a$ to its normal position or in direction of the said cam so that at the final movement of the shaft $28^a$, or just as its controlling rollers leave the cam, the aforesaid crank arm 29 will enter the space between the lugs 36 and thus lock the fingers 23 in their gathering positions, or at right angles to the spokes of the descending and partially ascending series, and it is evident that when the roller 33 engages with the track 14, the shaft $28^a$ will be forced sufficiently far inward to free the aforesaid crank arms from the said lugs 36 and thus admit of a rotation of said shaft.

By reference to Fig. 3, it will be observed that a space intervenes between the inner edge of the cam C and the receiving end of the flange 15, while the receiving end $14^a$ of the track 14 is carried to said edge, therefore the roller 33 first engages the cam and forces the crank arm on the shaft $28^a$ from locking engagement with the lugs 36, permitting the roller 32, which then quickly engages the cam, to perform its functions.

Having thus described my invention, I claim as new and desire to secure by Letters Patent,—

1. In a corn harvester or like machine, a gathering wheel consisting of a central shaft, spokes in series carried by the shaft, a pivoted finger at the outer end of each spoke, the fingers being also in series, a shifting shaft for each series of fingers, pivoted links extending from the fingers of each series of fingers, connections between the links and the shifting shafts, and means for consecutively carrying the shifting shafts first to an operative position and then restoring them to normal position during the rotation of the wheel, whereby the series of fingers is consecutively moved at right angles to the spokes and are then brought into longitudinal alinement therewith.

2. In a corn harvester, the combination with a frame, a gathering wheel mounted to revolve in the frame, said wheel comprising a central shaft, spokes in series supported from the shaft, and fingers in corresponding series pivoted to the outer terminal portions of the spokes, of a shifting shaft for each series of fingers, a cam mounted at the end portion of the central shaft being independent of the said shaft, and a crank arm from each shifting shaft in engagement with the said cam.

3. In a corn harvester or like machine, the combination with a frame and a gathering wheel, said gathering wheel comprising a shaft mounted to revolve in the frame, spokes in series supported from the said shaft, fingers pivoted to the outer terminals of the spokes, a shifting shaft for each series of fingers, spring connections between the shifting shafts, and link connections between the shifting shafts and the said fingers, and crank arms one at the outer end portion of each shifting shaft, of a cam secured on the frame, having a flange for engagement with the crank arms at the outer ends of the shifting shafts, and means for locking the said shifting shafts and releasing them through the medium of the said cam.

4. In a corn harvester or like machine, the combination with a frame and a gathering wheel mounted to revolve in the said frame, the gathering wheel comprising a central shaft, spokes in series connected with the said shaft, a finger pivoted to the outer end portion of each spoke and a connecting bar for each series of fingers, of a shifting shaft for each series of fingers mounted to rotate, and likewise mounted for end movement, crank and link connections between the shifting shafts and the connecting shafts, tension devices controlling the movement of the shifting shafts in one direction, a crank arm at the end of each shifting shaft, and a roller also located at the same end of each shifting shaft, and a cam secured to the said frame having a flange for engagement by the outer crank arms of the shifting shafts, and a track for engagement by the wheels at the end portions of said shifting shafts.

In testimony whereof I have signed my name to this specification in the presence of two subscribing witnesses.

JOHN HETTRICH.

Witnesses:
   CHAS. G. RYAN,
   JAMES H. WAALLEY.